(12) United States Patent
Adachi (10) Patent No.: US 7,616,869 B2
(45) Date of Patent: Nov. 10, 2009

(54) TELEVISION RECEIVER EMBEDDED WITH DISC DEVICE AND METHOD FOR SETTING VIEWING LIMITATION LEVEL THEREOF

(75) Inventor: Takafumi Adachi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 847 days.

(21) Appl. No.: 11/312,631

(22) Filed: Dec. 21, 2005

(65) Prior Publication Data
US 2006/0136961 A1 Jun. 22, 2006

(30) Foreign Application Priority Data
Dec. 21, 2004 (JP) ............................ P2004-369962

(51) Int. Cl.
*H04N 5/00* (2006.01)
(52) U.S. Cl. ..................... 386/125; 725/25; 725/28; 725/31
(58) Field of Classification Search .................. 386/125; 725/25, 28, 31
See application file for complete search history.

(56) References Cited

FOREIGN PATENT DOCUMENTS

JP  A-2000-244830  9/2000

*Primary Examiner*—Thai Tran
*Assistant Examiner*—Girumsew Wendmagegn
(74) *Attorney, Agent, or Firm*—Morgan, Lewis & Bockius LLP (57) ABSTRACT

When a viewing limitation level is set from a receiver side, if the setting of the viewing limitation level is selected from a set-up screen, a TV side microcomputer displays an access code screen. When an access code is inputted, the microcomputer displays the setting select screen of the viewing limitation level of a broadcasting side. When an arbitrary viewing limitation level is selected, the microcomputer obtains the information of the viewing limitation level of a disc side from a viewing limitation level corresponding table and informs a disc side microcomputer of the information of the viewing limitation level and sets the viewing limitation level of the receiver side to the selected viewing limitation level. The disc side microcomputer sets the viewing limitation level of the disc side in accordance with the contents of the information.

16 Claims, 5 Drawing Sheets

| PARENTAL LEVEL | MPAA RATING | MEANING OF MPAA RATING |
|---|---|---|
| LEVEL 8 | X (PRELIMINARY) | |
| LEVEL 7 | NC-17 | MOST STRICT REGULATION. A PERSON UNDER 17 YEARS OLD IS INHIBITED FROM INPUTTING IRRESPECTIVE OF ANY REASON. WHEN HE OR SHE ENTERS A THEATER, HE OR SHE NEEDS SOMETIMES TO PRESENT AN IDENTIFICATION CARD DEPENDING ON A KIND OF THEATERS. THIS LEVEL IS SET IN AN EXTREMELY VIOLENT MOVIE OR WHEN A SEXUAL DESCRIPTION IS MARKED. |
| LEVEL 6 | R | A CHILD UNDER 17 YEARS OLD CANNOT INPUT AS LONG AS HE OR SHE IS NOT ACCOMPANIED BY A PROTECTOR. THIS LEVEL IS STRICTER THAN THE STANDARD OF JAPAN. ALL OF WORDS RELATED TO RACIAL DISCRIMINATION OR SEXUAL WORDS ARE OBJECTS TO BE EXAMINED. AN ACTION MOVIE IS ORDINARILY SET TO AN R-DESIGNATION FROM A REASON WHY THERE IS A DANGER WHEN CHILDREN IMITATE THE MOVIE. |
| LEVEL 5 | R (PRELIMINARY) | |
| LEVEL 4 | PG-13 | CHILDREN UNDER 13 YEARS OLD NEED A STRONG CONSENT OF A PROTECTOR WHEN THEY ENTER A THEATER. ORDINARILY, FILM DRAMAS PUT ON THE SCREEN INCLUDE MANY WORKS OF PG-13. |
| LEVEL 3 | PG | WHEN CHILDREN ENTER A THEATER, THEY PREFERABLY HAVE THE CONSENT OF A PARENT. |
| LEVEL 2 | PG (PRELIMINARY) | |
| LEVEL 1 | G | |

| MEANING OF PARENTAL LEVEL | PARENTAL LEVEL | MPAA RATING | MEANING OF MPAA RATING |
|---|---|---|---|
| REPRODUCE ALL DISCS WITHOUT LIMITATION | LEVEL 8 | X (PRELIMINARY) | |
| PERSONS UNDER 18 YEARS OLD CANNOT VIEW | LEVEL 7 | NC-17 | MOST STRICT REGULATION. A PERSON UNDER 17 YEARS OLD IS INHIBITED FROM INPUTTING IRRESPECTIVE OF ANY REASON. WHEN HE OR SHE ENTERS A THEATER, HE OR SHE NEEDS SOMETIMES TO PRESENT AN IDENTIFICATION CARD DEPENDING ON A KIND OF THEATERS. THIS LEVEL IS SET IN AN EXTREMELY VIOLENT MOVIE OR WHEN A SEXUAL DESCRIPTION IS MARKED. |
| DISCS FOR ORDINARY PEOPLE INCLUDING R DESIGNATION AND DISCS FOR CHILDREN CAN BE REPRODUCED. IN THIS CASE, CHILDREN UNDER A JUNIOR HIGH SCHOOL CANNOT VIEW | LEVEL 6 | R | A CHILD UNDER 17 YEARS OLD CANNOT INPUT AS LONG AS HE OR SHE IS NOT ACCOMPANIED BY A PROTECTOR. THIS LEVEL IS STRICTER THAN THE STANDARD OF JAPAN. ALL OF WORDS RELATED TO RACIAL DISCRIMINAT ON OR SEXUAL WORDS ARE OBJECTS TO BE EXAMINED. AN ACTION MOVIE IS ORDINARILY SET TO AN R-DESIGNATION FROM A REASON WHY THERE IS A DANGER WHEN CHILDREN IMITATE THE MOVIE. |
| | LEVEL 5 | R (PRELIMINARY) | |
| | LEVEL 4 | PG-13 | CHILDREN UNDER 13 YEARS OLD NEED A STRONG CONSENT OF A PROTECTOR WHEN THEY ENTER A THEATER. ORDINARILY, FILM DRAMAS PUT ON THE SCREEN INCLUDE MANY WORKS OF PG-13. |
| DISCS FOR ORDINARY PEOPLE EXCEPT R DESIGNATION AND DISCS FOR CHILDREN CAN BE REPRODUCED | LEVEL 3 | PG | WHEN CHILDREN ENTER A THEATER, THEY PREFERABLY HAVE THE CONSENT OF A PARENT. |
| | LEVEL 2 | PG (PRELIMINARY) | |
| DISCS FOR CHILDREN CAN BE REPRODUCED | LEVEL 1 | G | |

TELEVISION RECEIVER EMBEDDED WITH DISC DEVICE AND METHOD FOR SETTING VIEWING LIMITATION LEVEL THEREOF

BACKGROUND OF THE INVENTION

1. Field

The present invention relates to a disc device incorporated television receiver in which a control unit of a disc device having a parental function capable of setting a viewing limitation level of a disc side is connected to a control unit of a television receiver having a V-CHIP function capable of setting a viewing limitation level of a broadcasting side by a communication bus. More particularly, the present invention relates to a disc device incorporated television receiver in which the viewing limitation levels of a disc device side and a television receiver side can be set in cooperation with each other, and a method for setting the viewing limitation level thereof.

2. Description of the Related Art

In broadcasting systems such as a terrestrial broadcasting or a cable television and a satellite broadcasting, to limit the reception of video signals including violent scenes or sexual scenes, a V-CHIP system has been proposed. In the V-CHIP system, data showing viewing limitation levels is added respectively to programs to be broadcast. In a television receiver side for receiving the programs on which a V-CHIP function is mounted, levels at which the programs can be viewed are preset, and only the programs satisfying the set levels can be received.

On the other hand, a television receiver having a viewing limitation function is also proposed in which a user looking at a television is recognized by biological information such as a fingerprint, voice and a pupil to automatically decide whether or not the viewing limitation is carried out in accordance with a result and perform the viewing limitation (for instance, see JP-A-2000-244830).

Further, in recent disc devices, for instance, some of DVD (Digital Versatile Disc) devices have parental functions mounted that can restrain the user from viewing violent scenes or sexual scenes depending on the user's age.

When the disc device on which the parental function is mounted is externally connected to the television receiver on which the V-CHIP function is mounted and used, the user sets, in the DVD device, the viewing limitation level of the DVD device side by using a remote controller for the DVD and sets, in the television receiver, the viewing limitation level of the television receiver side by using a remote controller for a television.

Recently, a disc device incorporated television receiver has been provided in which the disc device having the parental function mounted is incorporated integrally in the television receiver on which the V-CHIP function is mounted. In this case, the viewing limitation level (parental level) by the parental function does not correspond to the viewing limitation level of the V-CHIP function in the ratio of 1 to 1. Accordingly, in such a disc device incorporated television receiver, one exclusive remote controller is used to individually set the viewing limitation level of the television receiver side and the viewing limitation level of the DVD device side.

Specifically, a TV set-up screen of the television receiver (simply referred to as a "receiver", hereinafter) side is firstly displayed by using the exclusive remote controller. When a V-CHIP setting is selected from the screen, then, an access code screen is displayed. Thus, an access code (first cipher code) of a TV side is inputted. Then, since a V-CHIP setting screen is displayed, when a TV rating is selected from the V-CHIP setting screen, a TV rating screen is displayed. A desired rating (viewing limitation level) is selected from ratings displayed on the TV rating screen, so that the viewing limitation level of the receiver side is set. Then, the user displays a DVD set-up screen of the DVD device side by using the exclusive remote controller. When the user selects a parental setting from the screen, then, an access code screen is displayed. When the user inputs an access code (second cipher code) of the device side on the screen, then, a parental setting screen is displayed. When the user selects a desired level (viewing limitation level) from parental levels displayed on the parental setting screen so that the viewing limitation level of the DVD device side is set.

As described above, in the usual disc device incorporated television receiver, when the viewing limitation level of the receiver side and the viewing limitation level of the DVD device side are set, the viewing limitation levels need to be individually set from individual set-up screens by using the one exclusive remote controller. Therefore, the user operates the one exclusive remote controller, however, this operation is actually the same as the individual operations of two remote controllers. Thus, the user is forced to perform a complicated and troublesome operation. Further, as for the access code for setting the viewing limitation level, since two access codes are necessary for the DVD device side and the television receiver side in spite of the integral type, it is complicated to use the two access codes separately.

Further, since the viewing limitation levels need to be individually set in the DVD device side and the television receiver side, for instance, a forget to set may be possibly occurs that although the viewing limitation level is set in the DVD device side, the setting of the viewing limitation level is forgotten in the television receiver.

Still further, when the viewing limitation levels are individually set in the DVD device side and the television receiver side, for instance, if the viewing limitation level of the DVD device side is set to be low and the viewing limitation level of the television receiver side is set to be higher than it, a program that does not satisfy the viewing limitation level of the television receiver side, however satisfies the viewing limitation level of the DVD device side can be received and viewed without a problem. However, when the program is recorded by the DVD device and the recorded program is reproduced, the program is inconveniently caught by the viewing limitation level of the DVD device side and cannot be viewed.

Accordingly, for instance, when the user sets the viewing limitation level of the television receiver, the user ordinarily sets the viewing limitation level of the DVD device so as to correspond thereto. However, since the viewing limitation levels of the device and the television receiver need to be individually set as described above, there is a possibility that the viewing limitation levels may be undesirably set to wrong levels.

For the viewing limitation level of the television receiver side, levels can be set that correspond to MPAA ratings six levels of G, PG, PG-13, R, NC-17 and X) as independently regulated codes of MPAA (Motion Picture Association America). On the other hand, for the viewing limitation level of the DVD device side, levels can be set that correspond to the parental level composed of eight levels of a level 1 to a level 8. The divisions of the levels of both the sides are different. Consequently, for instance, the user hardly understand to which level in the parental level, R in the MPAA ratings corresponds, Which indices the wrong levels to be set.

SUMMARY OF THE INVENTION

The present invention provides a disc device incorporated television receiver in which the setting operations of viewing limitation levels of a disc device side and a television receiver side are associated with each other and both the viewing limitation levels can be set in a series of operations to simplify a function and assuredly prevent a forget to set one viewing limitation level and the occurrence of an inconvenience such as a discord of both the set levels, and a method for setting a viewing limitation level thereof.

A television receiver embedded with a disc device, the television receiver includes: a disc device having a parental function capable of setting a first viewing limitation level of a disc side; a television receiver having a V-CHIP function capable of setting a second viewing limitation level of a broadcasting side; a first control unit that controls the disc device; a second control unit that controls the television receiver, and is connected with the first control unit by a communication bus; and a storage that stores a viewing limitation level corresponding table that indicates correspondence between the first viewing limitation level and the second viewing limitation level, wherein the second control unit performs: controlling the television receiver to display an access code input screen, when setting of the second viewing limitation level is selected by a user via a set-up screen displayed on the television receiver; controlling the television receiver to display a second viewing limitation level setting screen, when an access code is input; obtaining, when the second viewing limitation level is selected, the first viewing limitation level that corresponds to the selected second viewing limitation level by referring to the viewing limitation level table; notifying the obtained first viewing limitation level to the first control unit; and setting the second viewing limitation level in the television receiver, and wherein the first control unit performs: controlling the television receiver to display a first viewing limitation level setting screen in accordance with the notified first viewing limitation level; and setting the notified first viewing limitation level in the disc device.

A television receiver embedded with a disc device, the television receiver includes: a disc device having a parental function capable of setting a first viewing limitation level of a disc side; a television receiver having a V-CHIP function capable of setting a second viewing limitation level of a broadcasting side; a first control unit that controls the disc device; a second control unit that controls the television receiver, and is connected with the first control unit by a communication bus; and a storage that stores a viewing limitation level corresponding table that indicates correspondence between the first viewing limitation level and the second viewing limitation level, wherein when either one of the first viewing limitation level and the second viewing limitation level is set by a user, the first control unit and the second control unit communicates with each other to set the other of the first viewing limitation level and the second viewing limitation level by referring to the viewing limitation level corresponding table.

A method for setting a viewing limitation level of a television receiver embedded with a disc device, the television receiver including: a disc device having a parental function capable of setting a first viewing limitation level of a disc side; a television receiver having a V-CHIP function capable of setting a second viewing limitation level of a broadcasting side; a first control unit that controls the disc device; a second control unit that controls the television receiver, and is connected with the first control unit by a communication bus; and a storage that stores a viewing limitation level corresponding table that indicates correspondence between the first viewing limitation level and the second viewing limitation level, the method includes: displaying an access code input screen, when setting of the second viewing limitation level is selected by a user via a set-up screen displayed on the television receiver; displaying a second viewing limitation level setting screen, when an access code is input; obtaining, when the second viewing limitation level is selected, the first viewing limitation level that corresponds to the selected second viewing limitation level by referring to the viewing limitation level table; notifying the obtained first viewing limitation level to the first control unit; setting the second viewing limitation level in the television receiver; displaying a first viewing limitation level setting screen in accordance with the notified first viewing limitation level; and setting the notified first viewing limitation level in the disc device.

A method for setting a viewing limitation level of a television receiver embedded with a disc device, the television receiver including: a disc device having a parental function capable of setting a first viewing limitation level of a disc side; a television receiver having a V-CHIP function capable of setting a second viewing limitation level of a broadcasting side; a first control unit that controls the disc device; a second control unit that controls the television receiver, and is connected with the first control unit by a communication bus; and a storage that stores a viewing limitation level corresponding table that indicates correspondence between the first viewing limitation level and the second viewing limitation level, the method includes: displaying an access code input screen, when setting of the first viewing limitation level is selected by a user via a set-up screen displayed on the television receiver; displaying a first viewing limitation level setting screen, when an access code is input; obtaining, when the first viewing limitation level is selected, the second viewing limitation level that corresponds to the selected first viewing limitation level by referring to the viewing limitation level table; notifying the obtained second viewing limitation level to the second control unit; setting the first viewing limitation level in the disc device; displaying a second viewing limitation level setting screen in accordance with the notified second viewing limitation level; and setting the notified second viewing limitation level in the television receiver.

BRIEF DESCRIPTION OF THE DRAWINGS

In the accompanying drawings:

FIG. 6 is an explanatory view of an MPAA rating setting screen and a parental setting screen which are formed in common, according to a fourth embodiment.

DETAILED DESCRIPTION

Now referring to the drawings, an explanation will be given of an embodiment of the viewing limitation setting method according to this invention.

Figure 1:
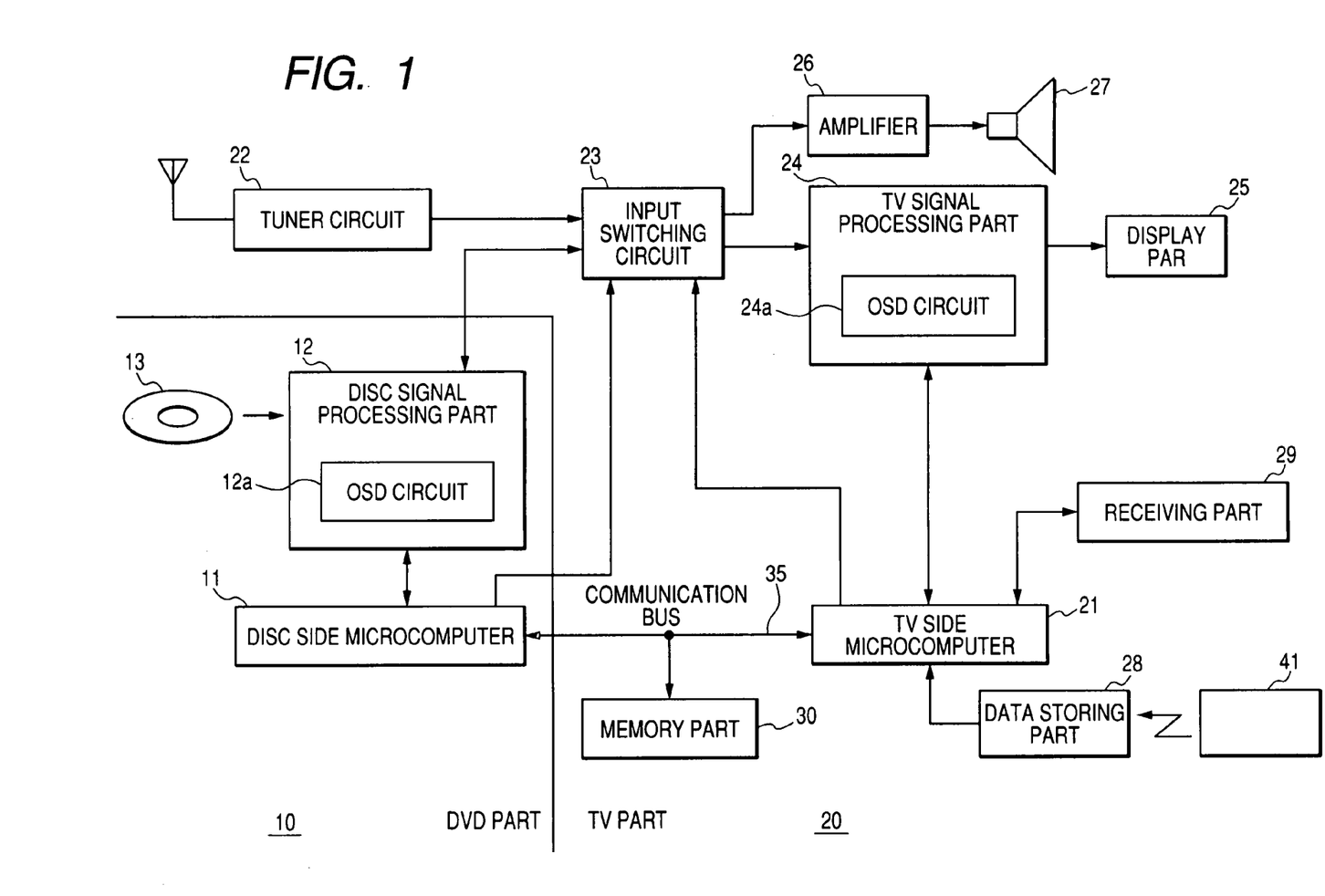
FIG. 1 is a functional block diagram showing an electric structure of main parts of a disc device incorporated television receiver.

FIG. 1 is a functional block diagram showing the electric structure of main parts of a disc device (for instance, a DVD device) incorporated television receiver according to an embodiment. Since a disc reproducing process by the DVD device or a signal process of a video or an audio by the television receiver is a usually known process, in this embodiment, they are respectively shown by simple functional blocks as a disc signal processing part and a TV signal processing part.

In the disc device incorporated television receiver of this embodiment, a disc control system 10 having a parental function capable of setting a viewing limitation level of a disc side is functionally linked with a TV system 20 having a V-CHIP function capable of setting a viewing limitation level of a broadcasting side and accommodated in one casing. A disc side microcomputer 11 for controlling the entire part of the disc control system 10 is bi-directionally connected to a TV side microcomputer 21 for controlling the entire part of the TV control system 20 by a communication bus 35.

The disc side microcomputer 11 controls a discriminating process for discriminating a kind of a disc 13 inserted into a main body or a disc signal processing part 12 for carrying out a reproducing process depending on the kind of the disc. Further, the disc signal processing part 12 is provided with an OSD circuit 12a for displaying various kinds of setting screens including a set-up screen for carrying out various kinds of settings of the disc device side.

On the other hand, an output of a tuner circuit 22 for receiving a television signal is connected to a TV signal processing part 24 through an input switching circuit 23 for switching an input of a disc generating signal from the disc signal processing circuit 12. The output of the TV signal processing part 24 is connected to a display part 25 such as a CRT. An output of the input switching circuit 23 is connected to an inner speaker 27 through an amplifier 26. Further, the TV signal processing part 24 includes an OSD circuit 24a for displaying various kinds of setting screens including a set-up screen for carrying out various kinds of settings of the television receiver side.

The TV side microcomputer 21 controls the TV signal processing part 24 that decodes the television signal received through the tuner circuit 22 to a video signal or an audio signal, displays the video signal on the display part 25 and outputs the audio signal from the inner speaker 27.

Further, to the TV side microcomputer 21, a data storing part 28 composed of an EEPROM is connected that stores setting values of brightness (that is, bright, contrast, color, sharpness, tint, etc.) of a display screen preset at the time of shipment from a factory as initial values. Still further, to the TV side microcomputer 21, an output of a receiving part 29 for receiving various kinds of operating signals from a remote controller 41 is connected. The TV side microcomputer 21 controls the operations of the disc control system 10 and the TV control system 20 in accordance with various kinds of operating signals transmitted from the remote controller 41. Namely, in this embodiment, all control signals including power on and off signals of the disc control system 10 are transmitted to the disc side microcomputer 11 through the TV side microcomputer 21.

Further, the disc device incorporated television receiver of this embodiment includes a memory part 30 for storing a viewing limitation level corresponding table in which the viewing limitation level of a disc side corresponds to the viewing limitation level of a broadcasting side. The memory part 30 is connected to a line of the communication bus 35. That is, the memory part 30 can be accessed by both the disc side microcomputer 11 and the TV side microcomputer 21. As the memory part 30, an EEPROM or a flash memory may be used. Further, the memory part 30 and the data storing part 28 may be commonly employed. However, in this embodiment, the memory part 30 and the data storing part 28 are separately provided.

Figure 2:
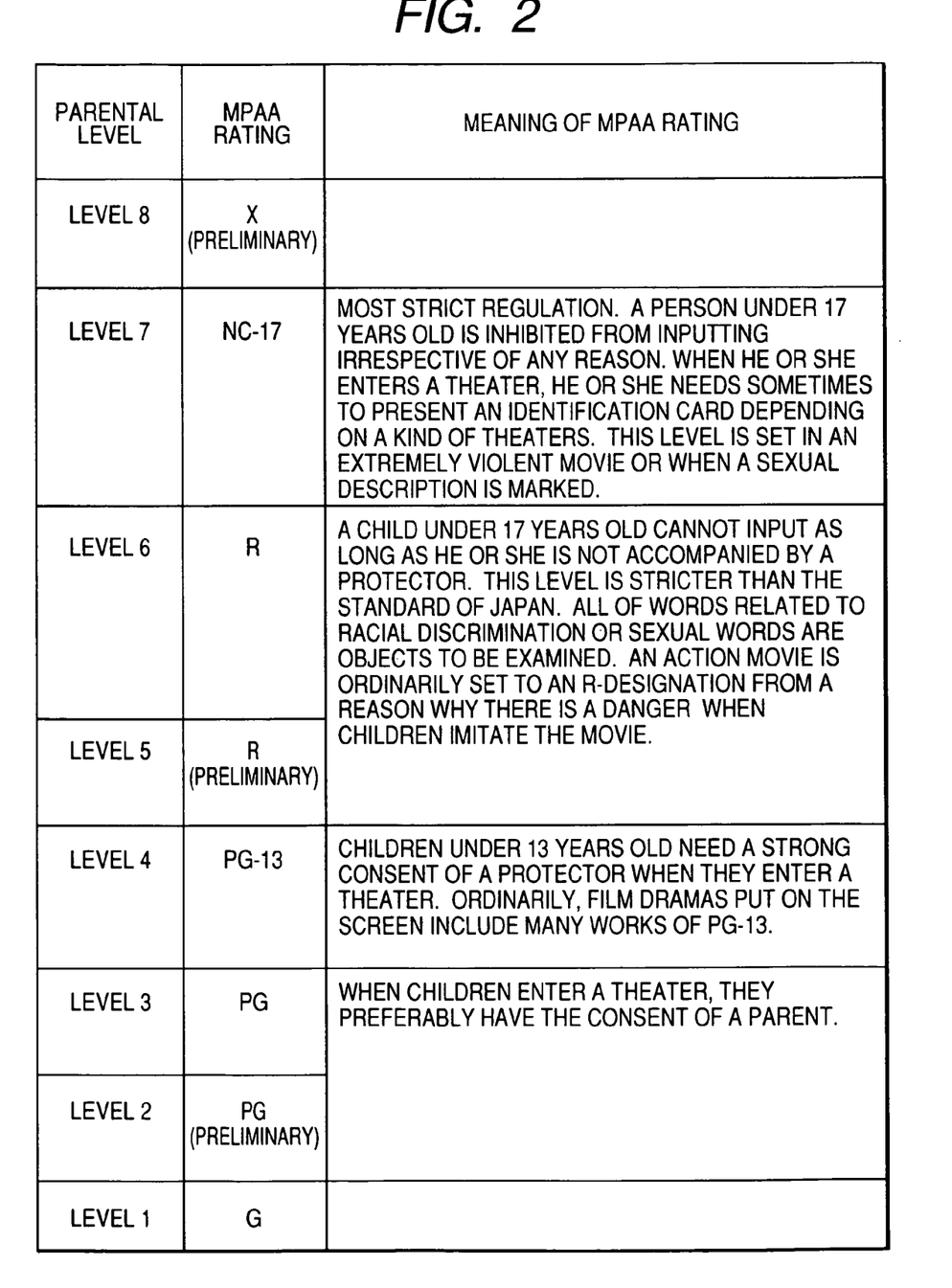
FIG. 2 is an explanatory view showing a structural example of a viewing limitation level corresponding table stored in a memory part.

FIG. 2 shows a structural example of the viewing limitation level corresponding table stored in the memory part 30.

A parental level as the viewing limitation level of the disc side includes eight stages of a level 1 to a level 8 and an MPAA rating as the viewing limitation level of the broadcasting side includes six stages of G, PG, PG-13, R, NC-17 and X. Accordingly, in the viewing limitation level corresponding table of this embodiment, the viewing limitation level of the broadcasting side that does not correspond to the viewing limitation level of the disc side on 1 to 1 basis (in FIG. 2, a part described as "preliminary") is allowed to be duplicated and correspond to the higher level.

Specifically, as shown in FIG. 2, "G" of the MPAA rating is allowed to correspond to the "level 1" of the parental level. "PG" of the MPAA rating is allowed to correspond respectively to the "level 2" and the "level 3" of the parental level. "PG-13" of the MPAA rating is allowed to correspond to the "level 4" of the parental level. "R" of the MPAA rating is allowed to correspond respectively to the "level 5" and the "level 6" of the parental level. "NC-17" of the MPAA rating is allowed to correspond to the "level 7" of the parental level. "X" of the MPAA rating is allowed to correspond to the "level 8" of the parental level. Thus, the viewing limitation level of the disc side is allowed to correspond to the viewing limitation level of the broadcasting side on 1 to 1 basis. When a reference is newly added, the viewing limitation level corresponding table may be changed so that the new reference may be applied to a part corresponding to the preliminary part coordinated at this time.

In the above-described structure of this embodiment, in accordance with either the setting operation of the viewing limitation level of the disc device side by a user or the setting operation of the viewing limitation level of the television reviver side, the viewing limitation level of the other side can be set at the same time on the basis of the corresponding relation of the viewing limitation level corresponding table shown in FIG. 2. That is, during the setting process of the viewing limitation level, the TV side microcomputer 21 and the disc side microcomputer 11 bi-directionally perform a data communication through the communication bus 35 to perform a series of processes so that the viewing limitation levels of the disc device side and the television receiver side correspond to each other. Now, a viewing limitation level setting process at this time will be described by way of specific embodiments.

First Embodiment

In a first embodiment, the setting process of the viewing limitation level of the disc device side is carried out in series via the setting process of the viewing limitation level of the television receiver. Now, a procedure of the viewing limitation level setting process of the first embodiment will be described below with reference to a state transition diagram shown in FIG. 3.

Figure 3:
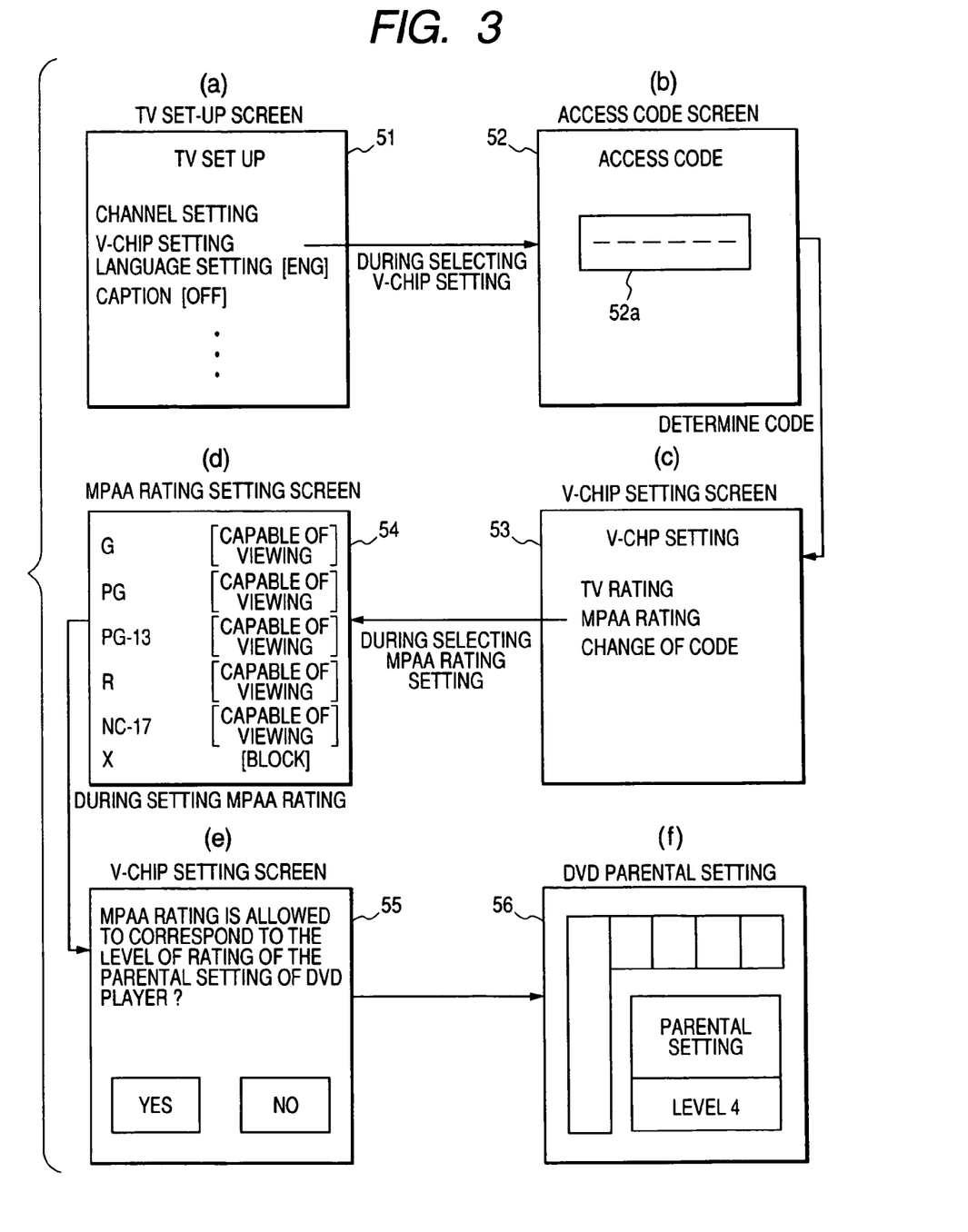
FIG. 3 is an explanatory view showing a state transition diagram of display screens according to a procedure of viewing limitation level setting processes of a first embodiment.

The user operates the remote controller 41, uses the OSD circuit 24a of the TV signal processing part 24 to set the viewing limitation level of the receiver side and displays a TV set-up screen 51 shown in (a) of FIG. 3 on the display part 25 to select an item of "V-CHIP setting" therefrom. In the display part 25, an access code screen 52 shown in (b) of FIG. 3.

The user inputs a predetermined access code of, for instance, four figures, to a code input window 52a of the access code screen 52 by operating the remote controller 41 and presses a determination button not shown in the drawing. Thus, in the display part 25, a V-CHIP setting screen 53 shown in (c) of FIG. 3 is displayed. In the V-CHIP setting screen 53, displayed are a "TV rating" selected when V-CHIP is set only by the receiver and an "MPAA rating" selected when the viewing limitation level is set in series to the disc device side from the receiver side according to this embodiment. A necessary item such as a "change of code" is displayed in addition thereto.

The user selects the item of the "MPAA rating" on the V-CHIP setting screen 53. Thus, in the display part 25, an MPAA rating setting screen 54 shown in (d) of FIG. 3 is shown. On the MPAA rating setting screen 54, the levels of six stages of the MPAA rating are displayed. In the right side thereof, the states of the present viewing limitation levels of the receiver are displayed. That is, in the present state, "X" is "blocked" and other "G" to "NC-17" can be "viewed". In other words, as the MPAA rating, "X" is set.

Here, for instance, when the user selects "PG-13" in the MPAA rating setting screen 54, in the display part 25, a V-CHIP setting screen 55 shown in (e) of FIG. 3 is displayed. This screen indicates a recognizing screen for the user. When the user selects "YES" on the screen, in the display part 25, a parental setting screen 56 of a DVD shown in (f) of FIG. 3 is displayed.

That is, when "YES" on the V-CHIP setting screen 55 is selected, the TV side microcomputer 21 obtains the parental level corresponding to the level "PG-13" of the MPAA rating selected in the MPAA rating setting screen 54 shown in (d) of FIG. 3 from the viewing limitation level corresponding table shown in FIG. 2 and informs the disc side microcomputer 11 of obtained parental level information (in this example, information showing the level 4) through the communication bus 35. Then, the TV side microcomputer 21 stops the driving of the OSD circuit 24a. Thus, the disc side microcomputer 11 uses the OSD circuit 12a of the disc signal processing part 12 to display the parental setting screen 56 shown in (f) of FIG. 3 on the display part 25.

At this time, the TV side microcomputer 21 sets the viewing limitation level of the receiver side to the level "PG-13" of the MPAA rating.

The disc side microcomputer 11 displays the parental setting screen 56 shown in (f) of FIG. 3 for a prescribed time (for instance, five seconds). The parental setting screen 56 at this time informs the user that the viewing limitation level of the disc device side is set to the "level 4". When the user desires to change the set level, the user may newly carry out a setting operation of a parental level for the five seconds during which the parental setting screen is displayed. However, an explanation of this operation is omitted herein. Then, when a display period is of the five seconds elapses without performing a new operation by the user, the disc side microcomputer 11 sets the viewing limitation level of the disc device side to the "level 4".

As described above, according to the first embodiment, when the viewing limitation level is set from the receiver side, the access code inputted by the user may be only one kind (that is, an input is carried out only once). Since the access code does not need to be individually inputted in the receiver side and the disc device side as usually carried out, the setting function of the viewing limitation level can be simplified.

Second Embodiment

In a second embodiment, the setting process of the viewing limitation level of the television receiver side is carried out in series via the setting process of the viewing limitation level of the disc device. Now, a procedure of the viewing limitation level setting process of the second embodiment will be described below with reference to a state transition diagram shown in FIG. 4.

Figure 4:
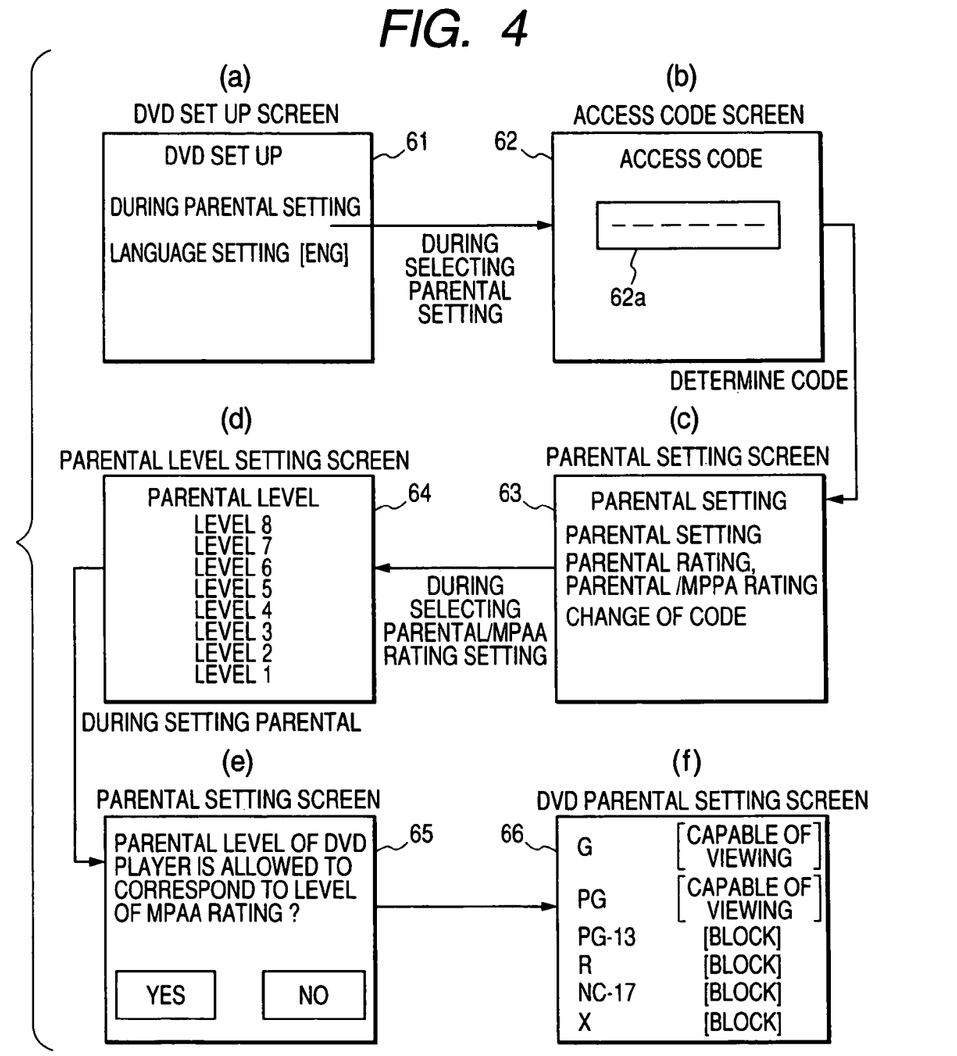
FIG. 4 is an explanatory view showing a state transition diagram of display screens according to a procedure of viewing limitation level setting processes of a second embodiment.

The user operates the remote controller 41, uses the OSD circuit 12a of the disc signal processing part 12 to set the viewing limitation level of the disc device side and displays a DVD set-up screen 61 shown in (a) of FIG. 4 on the display part 25 to select an item of "parental setting" therefrom. Thus, in the display part 25, an access code screen 62 shown in (b) of FIG. 4.

The user inputs a predetermined access code of, for instance, four figures, to a code input window 62a of the access code screen 62 by operating the remote controller 41 and presses a determination button not shown in the drawing. Thus, in the display part 25, a parental setting screen 63 shown in (c) of FIG. 4 is displayed. In the parental setting screen 63, displayed are a "parental rating" selected when parental is set only by the disc device and an "parental/MPAA rating" selected when the viewing limitation level is set in series to the receiver side from the disc side according to this embodiment. A necessary item such as a "change of code" is displayed in addition thereto.

Here, the user selects the item of the "parental/MPAA rating" on the parental setting screen 63. Thus, in the display part 25, a parental setting screen 64 shown in (d) of FIG. 4 is shown. On the parental setting screen 64, the levels of eight stages of the parental level are displayed. In this case, when the parental level is already set, all low-order levels (low viewing limitation levels) including the set level are inverted and displayed. In this example, the "level 2" and the "level 1" are inverted and displayed (in the drawing, shown by oblique lines). That is, as the parental level, the "level 2" is set.

Here, for instance, when the user selects the "level 4" in the parental level setting screen 64, in the display part 25, a parental setting screen 65 shown in (e) of FIG. 4 is displayed. This screen indicates a recognizing screen for the user. When the user selects "YES" on the screen, in the display part 25, an MPAA rating setting screen 66 of the receiver side shown in (f) of FIG. 4 is displayed.

That is, when "YES" on the parental setting screen 65 is selected, the disc side microcomputer 11 obtains the level of the MPAA rating corresponding to the "level 4" of the parental selected in the parental setting screen 64 shown in (d) of FIG. 4 from the viewing limitation level corresponding table shown in FIG. 2 and informs the TV side microcomputer 21 of obtained MPAA rating level information (in this example, information showing the level "PG-13") through the communication bus 35. Then, the disc side microcomputer 11 stops the driving of the OSD circuit 12a. Thus, the TV side microcomputer 21 uses the OSD circuit 24a of the TV signal processing part 24 to display the MPAA rating setting screen 66 shown in (f) of FIG. 4 on the display part 25.

At this time, the disc side microcomputer 11 sets the viewing limitation level of the disc side to the "level 4".

The TV side microcomputer 21 displays the MPAA rating setting screen 66 shown in (f) of FIG. 4 for a prescribed time (for instance, five seconds). The MPAA rating setting screen 66 at this time informs the user that the viewing limitation level of the receiver side is set to the level "PG-3". When the user desires to change the set level, the user may newly carry out a setting operation of the MPAA rating for the five seconds during which the MPAA rating setting screen is displayed. However, an explanation of this operation is omitted herein. Then, when a display period of the five seconds elapses without performing a new operation by the user, the TV side microcomputer 21 sets the viewing limitation level of the receiver side to the level "PG-3".

As described above, according to the second embodiment, when the viewing limitation level is set from the disc device side, the access code inputted by the user may be only one kind (that is, an input is carried out only once). Since the access code does not need to be individually inputted in the receiver side and the disc device side as usually carried out, the setting function of the viewing limitation level can be simplified.

Third Embodiment

In a third embodiment, the V-CHIP setting screen 53(see (3) of FIG. 3) in the first embodiment and the parental setting screen 63 (see (c) of FIG. 4) in the second embodiment are formed in common. That is, the V-CHIP setting screen 53 and the parental setting screen 63 as a viewing limitation type select screen described in claims are commonly formed as a V-CHIP/parental setting screen 73 shown in FIG. 5.

Figure 5:
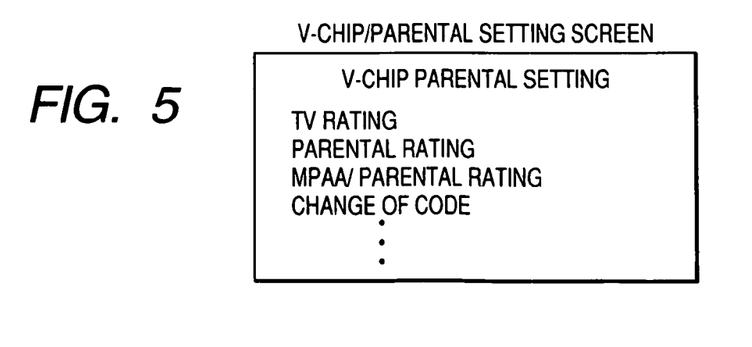
FIG. 5 is an explanatory view of a V-CHIP/parental setting screen formed in common according to a third embodiment.

In the V-CHIP parental setting screen 73, displayed are a "TV rating" selected when V-CHIP is set only by the receiver, a "parental rating" selected when the parental level is set only by the disc device and an MPAA/parental rating" selected when the viewing limitation level is set in series from the receiver side to the disc device side, or the viewing limitation level is set in series from the disc device side to the receiver side according to this embodiment.

Accordingly, for instance, the user starts the setting operation of the viewing limitation level or the receiver side to advance to the setting screens shown in (a) and (b) of FIG. 3. When the user advances to the V-CHIP setting screen 73 shown in FIG. 5, if the user desires to stop the setting of the receiver side and change it to the setting of the disc device side, the user selects the "parental rating" on the V-CHIP/parental setting screen 73 so that the disc side microcomputer 11 can actuate the OSD circuit 12a of the disc signal processing part 12 to shift to the parental setting screen (an illustration is omitted) only by the disc device. Similarly, for instance, the user starts the setting operation of the viewing limitation level of the disc device side to advance the setting screens shown in (a) and (c) of FIG. 4. When the user advances to the V-CHIP/parental setting screen 73 shown in FIG. 5, if the user desires to stop the setting of the disc device side and change it to the setting of the receiver side, the user selects the "TV rating" on the V-CHIP/parental setting screen 73 so that the TV side microcomputer 21 can actuate the OSD circuit 24a of the TV signal processing part 24 to shift to the TV rating setting screen (an illustration is omitted) only by the receiver.

As described above, in the third embodiment, both when the viewing limitation level is set from the receiver side and when the viewing limitation level is set from the disc device side, the common viewing limitation type select screen can be used and this screen can be immediately shifted to the setting screen of another device side. Thus, an extremely convenient and maneuverable structure can be provided for the user.

Fourth Embodiment

In the first embodiment, on the MPAA rating setting screen 54 shown in (d) of FIG. 3, only the levels of the MPAA rating are displayed. In the second embodiment, on the parental setting screen 64 shown in (d) of FIG. 4, only the parental levels are displayed so as to be selected by the user. However, in this structure, for instance, when the user selects "R" on the MPAA rating setting screen 54 shown in (d) of FIG. 3, the user cannot recognize to which level of the parental levels "R" corresponds at that time. When the user advances to a final recognizing screen shown in (f) of FIG. 3, the user can initially recognize the setting level of the disc device side. Therefore, when the user desires to change the setting level at that time, the user needs to return to the TV set-up screen 51 shown in (a) of FIG. 3 or to the MPAA rating setting screen 54 shown in (d) of FIG. 3 to select the MPAA rating again. This situation also arises, for instance, when the user selects an arbitrary level in the parental setting screen 64 shown in (d) of FIG. 4.

By taking the above-described points into consideration, in the fourth embodiment, the MPAA rating setting screen 54 ((d) of FIG. 3)in the first embodiment and the parental setting screen 64 ((d) of FIG. 4) in the second embodiment are made in more common form.

That is, the MPAA rating setting screen 54 ((d) of FIG. 3) and the parental setting screen 64 ((d) of FIG. 4) are employed to obtain a display form shown in FIG. 6. Namely, the relation of the viewing limitation level corresponding table shown in FIG. 2 is directly displayed on a screen. Thus, the user can recognize to which level of the parental levels the level of the MPAA rating corresponds at a glance and also recognize whether or not the level that the user tries to set is a proper level by looking at the explanation of the level. Accordingly, an operation for resetting the rating by the user can be saved.

As described above, there is provided a disc device incorporated television receiver in which a control unit of a disc device having a parental function capable of setting a viewing limitation level of a disc side is connected to a control unit of a television receiver having a V-CHIP function capable of setting a viewing limitation level of a broadcasting side by a communication bus, a viewing limitation level corresponding table is provided in which the viewing limitation level of the disc side corresponds to the viewing limitation level of the broadcasting side. When either the viewing limitation level of the disc device side is set by a user or the viewing limitation level of the television receiver side is set, the viewing limitation level of the other side is also set on the basis of the corresponding relation of the viewing limitation level corresponding table.

According to one of the setting operation of the viewing limitation level of the disc device side and the setting operation of the viewing limitation level of the television receiver side by the user, the other viewing limitation level is also set at the same time on the basis of the corresponding relation of the viewing limitation level corresponding table. Accordingly, a forgetting to set one viewing limitation level by the user or the occurrence of an inconvenience such as a discord of both the set levels can be assuredly prevented.

More specifically described, when the viewing limitation level is set by a user from the receiver side, if the setting of the viewing limitation level is selected from a set-up screen, the control unit of the receiver side displays an input screen of an access code. When the access code is inputted, the control unit of the receiver side displays the setting select screen of the viewing limitation level of the broadcasting side. When an arbitrary viewing limitation level is selected, the control unit of the receiver side obtains the information of the viewing limitation level of the disc side corresponding to the selected viewing limitation level from the viewing limitation level corresponding table to inform the control unit of the device side of the information of the viewing limitation level and sets the viewing limitation level of the receiver side to the selected viewing limitation level. The control unit of the device side displays the setting screen of the viewing limitation level of the disc side in accordance with the contents of the information, and then, sets the viewing limitation level of the device side to the viewing limitation level meeting the contents of the information.

When the viewing limitation level is set by a user from the disc device side, if the setting of the viewing limitation level is selected from a set-up screen, the control unit of the device side displays an input screen of an access code. When the access code is inputted, the control unit of the disc side displays the setting select screen of the viewing limitation level of the disc side. When an arbitrary viewing limitation level is selected, the control unit of the device side obtains the information of the viewing limitation level of the broadcasting side corresponding to the selected viewing limitation level from the viewing limitation level corresponding table to inform the control unit of the receiver side of the information of the viewing limitation level and sets the viewing limitation level of the device side to the selected viewing limitation level. The control unit of the receiver side displays the setting screen of the viewing limitation level of the broadcasting side in accordance with the contents of the information, and then, sets the viewing limitation level of the receiver side to the viewing limitation level meeting the contents of the information.

In the television receiver, both when the viewing limitation level is set from the receiver side and when the viewing limitation level is set from the disc device side, the access code inputted by the user is only one kind (that is, input only once), so that the setting function of the viewing limitation level can be simplified.

In the disc device incorporated television receiver, when the access code is inputted, the control unit of the receiver side displays a viewing limitation type select screen for selecting the viewing limitation type of either the receiver side or the device side. When the viewing limitation type of the device side is selected, the control unit of the receiver side informs the control unit of the device side of selected information and the control unit of the device side may continuously perform a process from the display of the setting select screen of the viewing limitation level of the disc side. Otherwise, when the access code is inputted, the control unit of the device side displays a viewing limitation type select screen for selecting the viewing limitation type of either the receiver side or the device side. When the viewing limitation type of the receiver side is selected, the control unit of the device side informs the control unit of the receiver side of selected information and the control unit of the receiver side may continuously perform a process from the display of the setting select screen of the viewing limitation level of the broadcasting side.

Both when the viewing limitation level is set from the receiver side and when the viewing limitation level is set from the disc device side, a common viewing limitation type select screen can be used and this screen can be immediately shifted to the setting screen of the other device side, so that an extremely convenient and maneuverable structure can be realized for the user.

Here, in the setting select screen of the viewing limitation level, both the viewing limitation level of the disc side and the viewing limitation level of the broadcasting side may be displayed in a coordinated form. Thus, when the user sets the viewing limitation level, the user can compare the level in the television receiver side with the level in the disc device side to assuredly select the best level for both the devices and save an operation for resetting the level.

In this case, when the viewing limitation level of the disc side includes eight levels from a level 1 to a level 8 and the viewing limitation level of the broadcasting side includes six levels of G, PG, PG-13, R, NC-17 and X in the viewing limitation level corresponding table, the viewing limitation level of the broadcasting side that does not correspond to the viewing limitation level of the disc side in the ratio of 1:1 may be allowed to be duplicated and correspond to the higher level. Specifically, for instance, G is allowed to correspond to the level 1, PG is allowed to correspond to the level 2 and the level 3, PG-13 is allowed to correspond to the level 4, R is allowed to correspond to the level 5 and the level 6, NC-17 is allowed to correspond to the level 7 and X is allowed to correspond to the level 8, respectively. Thus, since both the viewing limitation level of the disc side and the viewing limitation level of the broadcasting side are coordinated on 1 to 1 basis, the user can easily select the level.

Further, there is provided a method for setting a viewing limitation level of a disc device incorporated television receiver of the present invention in which a control unit of a disc device having a parental function capable of setting a viewing limitation level of a disc side is connected to a control unit of a television receiver having a V-CHIP function capable of setting a viewing limitation level of a broadcasting side by a communication bus, a viewing limitation level corresponding table is used in which the viewing limitation level of the disc side corresponds to the viewing limitation level of the broadcasting side. The method for setting a viewing limitation level of a disc device incorporated television receiver comprises: a step of displaying an input screen of an access code when the viewing limitation level is set by a user from the receiver side, if the setting of the viewing limitation level is selected from a set-up screen; a step of displaying the setting select screen of the viewing limitation level of the broadcasting side when the access code is inputted; a step of obtaining the information of the viewing limitation level of the disc side corresponding to a selected viewing limitation level from the viewing limitation level corresponding table to inform the control unit of the device side of the information of the viewing limitation level when an arbitrary viewing limitation level is selected; a step of setting the viewing limitation level of the receiver side to the selected viewing limitation level; a step of displaying the setting screen of the viewing limitation level of the disc side in accordance with the contents of the information, and a step of setting the viewing limitation level of the device side to the viewing limitation level meeting the contents of the information. The method may further comprise: a step of displaying a viewing limitation type select screen for selecting the viewing limitation type of either the receiver side or the device side before the setting select screen of the viewing limitation level of the broadcasting side is displayed, when the access code is inputted; and a step of informing the control unit of the device side of selected information when the viewing limitation type of the device side is selected and displaying the setting select screen of the viewing limitation level of the disc side.

Further, in a method for setting a viewing limitation level of a disc device incorporated television receiver of the invention in which a control unit of a disc device having a parental function capable of setting a viewing limitation level of a disc side is connected to a control unit of a television receiver having a V-CHIP function capable of setting a viewing limitation level of a broadcasting side by a communication bus, a viewing limitation level corresponding table is used in which the viewing limitation level of the disc side corresponds to the viewing limitation level of the broadcasting side. The method for setting a viewing limitation level of a disc device incorporated television receiver comprises: a step of displaying an input screen of an access code when the viewing limitation level is set by a user from the device side, if the setting of the viewing limitation level is selected from a set-up screen; a step of displaying the setting select screen of the viewing limitation level of the disc side when the access code is inputted; a step of obtaining the information of the viewing limitation level of the broadcasting side corresponding to a selected viewing limitation level from the viewing limitation level corresponding table to inform the control unit of the receiver side of the information of the viewing limitation level when an arbitrary viewing limitation level is selected; a step of setting the viewing limitation level of the disc side to the selected viewing limitation level; a step of displaying the setting screen of the viewing limitation level of the broadcasting side in accordance with the contents of the information, and a step of setting the viewing limitation level of the receiver side to the viewing limitation level meeting the contents of the information. The method may further comprise: a step of displaying a viewing limitation type select screen for selecting the viewing limitation type of either the receiver side or the device side before the setting select screen of the viewing limitation level of the disc side is displayed, when the access code is inputted; and a step of informing the control unit of the receiver side of selected information when the viewing limitation type of the receiver side is selected and displaying the setting select screen of the viewing limitation level of the broadcasting side.

According to the disc device incorporated television receiver and the method for setting a viewing limitation level thereof of the present invention, when either the viewing limitation level of the disc device side is set by a user or the viewing limitation level of the television receiver side is set, the viewing limitation level of the other side is also set at the same time on the basis of the corresponding relation of the viewing limitation level corresponding table. Accordingly, a forgetting to set one viewing limitation level or the occurrence of an inconvenience such as a discord of both the set levels can be assuredly prevented.

Further, according to the disc device incorporated television receiver and the method for setting a viewing limitation level thereof of the present invention, both when the viewing limitation level is set from the receiver side and when the viewing limitation level is set from the disc device side, a common viewing limitation type select screen can be used and this screen can be immediately shifted to the setting screen of the other device side, so that an extremely convenient and maneuverable structure can be realized for the user.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A television receiver embedded with a disc device, the television receiver comprising:
    a disc device having a parental function capable of setting a first viewing limitation level of a disc side;
    a television receiver having a V-CHIP function capable of setting a second viewing limitation level of a broadcasting side;
    a first control unit that controls the disc device;
    a second control unit that controls the television receiver, and is connected with the first control unit by a communication bus; and
    a storage that stores a viewing limitation level corresponding table that indicates correspondence between the first viewing limitation level and the second viewing limitation level,
    wherein the second control unit performs:
        controlling the television receiver to display an access code input screen, when setting of the second viewing limitation level is selected by a user via a set-up screen displayed on the television receiver;
        controlling the television receiver to display a second viewing limitation level setting screen, when an access code is input;
        obtaining, when the second viewing limitation level is selected, the first viewing limitation level that corresponds to the selected second viewing limitation level by referring to the viewing limitation level table;
        notifying the obtained first viewing limitation level to the first control unit; and
        setting the second viewing limitation level in the television receiver, and
    wherein the first control unit performs:
        controlling the television receiver to display a first viewing limitation level setting screen in accordance with the notified first viewing limitation level; and
        setting the notified first viewing limitation level in the disc device.

2. A television receiver embedded with a disc device, the television receiver comprising:
    a disc device having a parental function capable of setting a first viewing limitation level of a disc side;
    a television receiver having a V-CHIP function capable of setting a second viewing limitation level of a broadcasting side;
    a first control unit that controls the disc device;
    a second control unit that controls the television receiver, and is connected with the first control unit by a communication bus; and
    a storage that stores a viewing limitation level corresponding table that indicates correspondence between the first viewing limitation level and the second viewing limitation level,
    wherein when either one of the first viewing limitation level and the second viewing limitation level is set by a user, the first control unit and the second control unit communicates with each other to set the other of the first viewing limitation level and the second viewing limitation level by referring to the viewing limitation level corresponding table.

3. The television receiver according to claim 2, wherein when the first viewing limitation level includes eight levels from level 1 to level 8 and the second viewing limitation level of the broadcasting side includes six levels of G, PG, PG-13, R, NC-17 and X, the viewing limitation level corresponding table allows the second viewing limitation level that does not correspond to the first viewing limitation level in the ratio of 1:1 to be duplicated and correspond to the higher level.

4. The television receiver according to claim 2, wherein the second control unit performs:
    controlling the television receiver to display an access code input screen, when setting of the second viewing limitation level is selected by a user via a set-up screen displayed on the television receiver;
    controlling the television receiver to display a second viewing limitation level setting screen, when an access code is input;
    obtaining, when the second viewing limitation level is selected, the first viewing limitation level that corresponds to the selected second viewing limitation level by referring to the viewing limitation level table;
    notifying the obtained first viewing limitation level to the first control unit; and
    setting the second viewing limitation level in the television receiver, and
wherein the first control unit performs:
    controlling the television receiver to display a first viewing limitation level setting screen in accordance with the notified first viewing limitation level; and
    setting the notified first viewing limitation level in the disc device.

5. The television receiver according to claim 4, wherein the second control unit performs:
    controlling the television receiver to display a viewing limitation type select screen for selecting a viewing limitation type indicating one of the first viewing limitation level and the second viewing limitation level, when an access code is input; and
    notifying, when the selected viewing limitation type indicates the first viewing limitation level, the selected viewing limitation type to the first control unit, and
    wherein the first control unit performs taking over a process of controlling the display of the television receiver from the second control unit and controls the television receiver to display a setting select screen for selecting the first viewing limitation level.

6. The television receiver according to claim 5, wherein the second control unit performs controlling the television receiver to display the viewing limitation type select screen in a manner that the first viewing limitation level and the second viewing limitation level are coordinated.

7. The television receiver according to claim 4, wherein the first control unit performs:
    controlling the television receiver to display a viewing limitation type select screen for selecting a viewing limitation type indicating one of the first viewing limitation level and the second viewing limitation level, when an access code is input; and
    notifying, when the selected viewing limitation type indicates the second viewing limitation level, the selected viewing limitation type to the second control unit, and
    wherein the second control unit performs taking over a process of controlling the display of the television receiver from the first control unit and controls the television receiver to display a setting select screen for selecting the second viewing limitation level.

8. The television receiver according to claim 7, wherein the second control unit performs controlling the television receiver to display the viewing limitation type select screen in a manner that the first viewing limitation level and the second viewing limitation level are coordinated.

9. A method for setting a viewing limitation level of a television receiver embedded with a disc device, the television receiver including: a disc device having a parental function capable of setting a first viewing limitation level of a disc side; a television receiver having a V-CHIP function capable of setting a second viewing limitation level of a broadcasting side; a first control unit that controls the disc device; a second control unit that controls the television receiver, and is connected with the first control unit by a communication bus; and a storage that stores a viewing limitation level corresponding table that indicates correspondence between the first viewing limitation level and the second viewing limitation level, the method comprising:
    displaying an access code input screen, when setting of the second viewing limitation level is selected by a user via a set-up screen displayed on the television receiver;
    displaying a second viewing limitation level setting screen, when an access code is input;
    obtaining, when the second viewing limitation level is selected, the first viewing limitation level that corresponds to the selected second viewing limitation level by referring to the viewing limitation level table;
    notifying the obtained first viewing limitation level to the first control unit;
    setting the second viewing limitation level in the television receiver;
    displaying a first viewing limitation level setting screen in accordance with the notified first viewing limitation level; and
    setting the notified first viewing limitation level in the disc device.

10. The method according to claim 9, further comprising:
    displaying a viewing limitation type select screen for selecting a viewing limitation type indicating one of the first viewing limitation level and the second viewing limitation level, when an access code is input and before displaying the second viewing limitation level; and
    notifying, when the selected viewing limitation type indicates the first viewing limitation level, the selected viewing limitation type to the first control unit.

11. The method according to claim 9, wherein the second viewing limitation level setting screen is displayed in a manner that the first viewing limitation level and the second viewing limitation level are coordinated.

12. The method according to claim 9, wherein when the first viewing limitation level includes eight levels from level 1 to level 8 and the second viewing limitation level of the broadcasting side includes six levels of G, PG, PG-13, R, NC-17 and X, the viewing limitation level corresponding table allows the second viewing limitation level that does not correspond to the first viewing limitation level in the ratio of 1:1 to be duplicated and correspond to the higher level.

13. A method for setting a viewing limitation level of a television receiver embedded with a disc device, the television receiver including: a disc device having a parental function capable of setting a first viewing limitation level of a disc side; a television receiver having a V-CHIP function capable of setting a second viewing limitation level of a broadcasting side; a first control unit that controls the disc device; a second control unit that controls the television receiver, and is connected with the first control unit by a communication bus; and a storage that stores a viewing limitation level corresponding table that indicates correspondence between the first viewing limitation level and the second viewing limitation level, the method comprising:
    displaying an access code input screen, when setting of the first viewing limitation level is selected by a user via a set-up screen displayed on the television receiver;

displaying a first viewing limitation level setting screen, when an access code is input;

obtaining, when the first viewing limitation level is selected, the second viewing limitation level that corresponds to the selected first viewing limitation level by referring to the viewing limitation level table;

notifying the obtained second viewing limitation level to the second control unit;

setting the first viewing limitation level in the disc device;

displaying a second viewing limitation level setting screen in accordance with the notified second viewing limitation level; and setting the notified second viewing limitation level in the television receiver.

14. The method according to claim 13, further comprising:

displaying a viewing limitation type select screen for selecting a viewing limitation type indicating one of the first viewing limitation level and the second viewing limitation level, when an access code is input and before displaying the first viewing limitation level; and notifying, when the selected viewing limitation type indicates the second viewing limitation level, the selected viewing limitation type to the second control unit.

15. The method according to claim 13, wherein the first viewing limitation level setting screen is displayed in a manner that the first viewing limitation level and the second viewing limitation level are coordinated.

16. The method according to claim 13, wherein when the first viewing limitation level includes eight levels from level 1 to level 8 and the second viewing limitation level of the broadcasting side includes six levels of G, PG, PG-13, R, NC-17 and X, the viewing limitation level corresponding table allows the second viewing limitation level that does not correspond to the first viewing limitation level in the ratio of 1:1 to be duplicated and correspond to the higher level.

* * * * *